US010769304B2

United States Patent
Jihn

(10) Patent No.: US 10,769,304 B2
(45) Date of Patent: Sep. 8, 2020

(54) APPARATUS AND METHOD FOR TRANSMITTING PERSONAL INFORMATION IN INDIVIDUALLY UNIDENTIFIABLE WAY

(71) Applicant: UNIVERSITY-INDUSTRY COOPERATION GROUP OF KYUNG HEE UNIVERSITY, Yongin-si (KR)

(72) Inventor: Chang Ho Jihn, Seongnam-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 328 days.

(21) Appl. No.: 15/544,057

(22) PCT Filed: Jan. 18, 2016

(86) PCT No.: PCT/KR2016/000510
§ 371 (c)(1),
(2) Date: Nov. 17, 2017

(87) PCT Pub. No.: WO2016/117891
PCT Pub. Date: Jul. 28, 2016

(65) Prior Publication Data
US 2018/0089463 A1 Mar. 29, 2018

(30) Foreign Application Priority Data
Jan. 19, 2015 (KR) .................. 10-2015-0008460

(51) Int. Cl.
*G06F 21/62* (2013.01)
*G06Q 30/02* (2012.01)
(Continued)

(52) U.S. Cl.
CPC ......... *G06F 21/6254* (2013.01); *G06Q 30/02* (2013.01); *H04L 9/0866* (2013.01); *H04L 63/0414* (2013.01); *H04L 2209/42* (2013.01)

(58) Field of Classification Search
CPC ............. G06F 21/6254; H04L 63/0414; H04L 2209/42; H04L 9/0866; H04L 9/3228; G06Q 30/02
See application file for complete search history.

(56) References Cited

U.S. PATENT DOCUMENTS

| 8,799,053 B1 * | 8/2014 | Goldberg | G06F 21/6254 |
| | | | 705/7.29 |
| 2003/0204406 A1 * | 10/2003 | Reardon | G06Q 30/02 |
| | | | 705/313 |

(Continued)

FOREIGN PATENT DOCUMENTS

| JP | 2002-268950 | 9/2002 |
| JP | 2005-234866 | 9/2005 |

(Continued)

OTHER PUBLICATIONS

EPO, extended European search report of EP 16740364.1 dated Aug. 14, 2018.

*Primary Examiner* — Meng Li
(74) *Attorney, Agent, or Firm* — Lex IP Meister, PLLC

(57) ABSTRACT

An apparatus for transmitting personal information in individually unidentifiable way, includes a communication unit connected with external terminals through a network and performing communication; a controller generating an unidentifiable identifier (ID) of the apparatus and setting a transmission cycle period, at least one acquisition interval and at least one disclosure interval; a list generator acquiring at least one ID list disclosed by an external terminal through the communication unit, and generating an ID list for storage, an ID list acquired in acquisition interval, an ID list (Continued)

for disclosure, and an ID list for transmission; and a memory storing the ID list for storage, the ID list acquired in acquisition interval, the ID list for disclosure, and the ID list for transmission, generated by the list generator.

12 Claims, 8 Drawing Sheets

(51) Int. Cl.
*H04L 9/08* (2006.01)
*H04L 29/06* (2006.01)

(56) References Cited

U.S. PATENT DOCUMENTS

| | | | |
|---|---|---|---|
| 2005/0262061 A1 | 11/2005 | Moritsu et al. | |
| 2006/0212943 A1* | 9/2006 | Kitazato | G06F 21/10 726/26 |
| 2010/0105454 A1* | 4/2010 | Weber | G06Q 30/02 463/1 |
| 2012/0162713 A1* | 6/2012 | Minamiyama | G06F 3/1205 358/1.15 |
| 2013/0073577 A1* | 3/2013 | Terada | G06Q 30/02 707/758 |
| 2014/0278748 A1* | 9/2014 | Shottan | G06F 3/0484 705/7.29 |
| 2015/0042449 A1* | 2/2015 | Suh | G07C 9/28 340/5.7 |

FOREIGN PATENT DOCUMENTS

| | | |
|---|---|---|
| KR | 10-2012-0139844 | 12/2012 |
| KR | 10-2013-0062326 | 6/2013 |
| KR | 10-2014-0135244 | 11/2014 |
| WO | 2013-055037 | 4/2013 |

\* cited by examiner

APPARATUS AND METHOD FOR TRANSMITTING PERSONAL INFORMATION IN INDIVIDUALLY UNIDENTIFIABLE WAY

TECHNICAL FIELD

The present invention relates to an apparatus and a method for transmitting personal information in individually unidentifiable way. More particularly, the present invention relates to an apparatus and a method for transmitting a history of personal activities and personal information to external apparatuses without violating personal information protection laws.

BACKGROUND ART

In modern society, personal information can be acquired from various organizations. Health, finance, and for-profit organizations such as hospitals, research laboratories, banks, insurance companies, retailers, and the like possess information that can be used for research, development, marketing, and other business purposes. However, it has been realized that personal privacy related to such date should be protected. In particular, information on personal health or personal financial conditions has high confidentiality.

Although certified organizations possess personal information, use of the personal information requires authorization of a national organization or can only be extremely restrictively used. However, as computer technology development has advanced, personal information has been publicly leaked by criminal conduct such as hacking, and the illegally accessed personal information has been wrongfully used for other criminal conduct.

Recently, a need for analysis of personal information has increased due to advances of big data-related technology. For data analysis, data a plurality of sources needs to be accessed in many cases. In research to determine an effect of a specific drug treatment, for example, records to be accessed are owned and managed by a group of people or a group of pharmacies who have prescribed the drug. In spite of an abundant flood of information, however, a compromise on a paradigm of personal information protection is needed to extract useful results by analyzing the information.

In particular, information related to infection by a disease not only corresponds to extremely personal information but it is also absolutely prohibited for any person to distribute or spread the personal information, excluding a person bound by confidentiality obligation from legislation on personal information protection. On the contrary, a system that can predict and alert disease infection is obviously needed for public benefit.

DISCLOSURE

Technical Problem

The present invention has been made in an effort to provide an apparatus and a method for transmitting personal information in individually unidentifiable way, which aims to predict assimilation, sympathy, or spread of a social phenomenon that can be spread between people, such as a social trend, a rumor, or a disease, a number of infectees, an infected area, or an infection route while protecting personal information.

In addition, the present invention provides an apparatus and a method for transmitting personal information in individually unidentifiable way, which can be utilized without acquiring, storing personal information, or disclosing personal information due to a mistake of an administrator or criminal conduct.

Technical Solution

According to one example of the present invention, an apparatus for transmitting personal information in individually unidentifiable way, includes: a communication unit connected with external terminals through a network and performing communication; a controller generating an unidentifiable identifier (ID) of the apparatus and setting a transmission cycle period, at least one acquisition interval and at least one disclosure interval; a list generator acquiring at least one ID list disclosed by an external terminal through the communication unit, and generating an ID list for storage, an ID list acquired in acquisition interval, an ID list for disclosure, and an ID list for transmission; and a memory storing the ID list for storage, the ID list acquired in acquisition interval, the ID list for disclosure, and the ID list for transmission, generated by the list generator.

The apparatus for transmitting personal information in individually unidentifiable way may further include: a list generation estimator estimating generation time of ID list acquired in acquisition interval and generation location of ID list acquired in acquisition interval; and a user interface.

The apparatus for transmitting personal information in individually unidentifiable way may further include an information determiner determining whether a first information of a user, input through the user interface, and a second information transmitted from a server, match.

The communication unit may include a module for Wi-Fi Direct, Wi-Fi, or Beacon communication.

The controller may include: a system set-up module determining the transmission cycle period, determining the acquisition interval for acquiring the ID list disclosed by the external terminal, and determining the disclosure interval for disclosing the ID list for disclosure; an ID generation module generating the unidentifiable ID of the apparatus; and a transmission determination module determining whether or not to transmit the ID list for transmission to a server.

The system set-up module may set the acquisition interval and the disclosure interval to be included once or multiple times within the transmission cycle. A start time and a termination time of the acquisition interval and the acquisition interval respectively may be set arbitrarily within the transmission cycle, or a start time of the acquisition interval may be set to be a ahead of the start time of the disclosure interval by a predetermined time. The transmission cycle of the apparatus may be the same as that of the external terminal.

The ID generation module may generate the unidentifiable ID by random combination of text, numbers, or symbols.

When generation location information is included in the ID list for transmission, the transmission determination module may control the ID list for transmission including the ID list acquired in acquisition interval and the generation location information to be disclosed to other terminal.

The list generator may include: first ID list generator generating the ID list for storage by using the ID list disclosed by the external terminal, wherein the ID list disclosed is acquired through the communication unit; second ID list generator generating the ID list for disclosure to be disclosed to an external terminal during the disclosure interval, by rearranging the order of IDs in the ID list for storage or extracting IDs from the ID list for storage stored in the memory; third ID list generator generating the ID list acquired in acquisition interval by storing or updating an infectee ID list for disclosure, acquired from the external terminal during the acquisition interval, and estimating the generation time and location information of the ID list acquired in acquisition interval; and fourth ID list generator generating the ID list for transmission to be transmitted to the server at a termination time of the transmission cycle.

According to another example of the present invention, a method for transmitting personal information in individually unidentifiable way by an apparatus, includes: (a) generating an identifier of the apparatus; (b) generating an ID list acquired in acquisition interval by using an ID list disclosed by an external terminal, wherein the ID list disclosed is acquired through the communication unit; (c) updating an ID list for storage by using an ID list acquired in acquisition interval; (d) generating an ID list for disclosure by rearranging the order of IDs or extracting IDs included in the ID list for storage; and (e) disclosing the ID list for disclosure to an external terminal.

The method, may further include, after (a) step, determining a disclosure interval of the ID list for disclosure.

The (c) step may include determining whether a redundant ID is included in the ID list acquired from the external terminal and removing the redundant ID.

The method, may further include, after (e) step, generating an ID list for transmission to be transmitted to a server at a termination time of transmission cycle.

The method, may further include, after the generating the ID list for transmission, transmitting the ID list for transmission to the server at the termination time of the transmission cycle.

The transmission of the ID list for transmission to the server may include disclosing the ID list for transmission to another terminal when the ID list for transmission includes the ID list acquired in acquisition interval with generation location information. The ID list for transmission may be transmitted to the server by other terminal.

Advantageous Effects

The apparatus for transmitting personal information in individually unidentifiable way according to the exemplary embodiments of the present invention can protect personal information and acquire more accurate information on assimilation, sympathy, or spread of a social phenomenon, a number of infectees, an infected area, or an infection route without disclosing personal information that is related to assimilation, sympathy, or spread of a social phenomenon such as a social trend, a rumor, a disease, an infection status, or a location.

MODE FOR INVENTION

Figure 1:
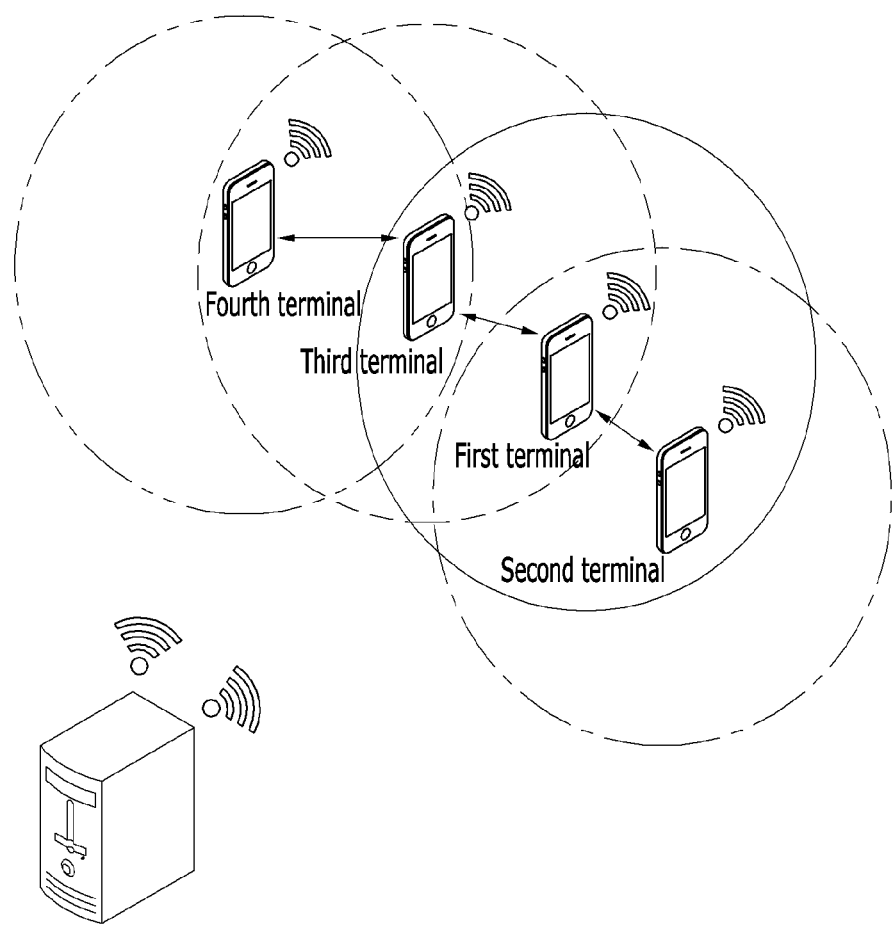
FIG. 1 is a schematic view for illustrating the utilization of a transmission apparatus according to an exemplary embodiment of the present invention.

Structural or functional descriptions specified with respect to exemplary embodiments according to a scope of the present invention, disclosed in the present specification, are exemplarily provided for the purpose of description of exemplary embodiments according to the scope of the present invention, and the described embodiments may be modified in various different ways, all without departing from the spirit or scope of the present invention.

Exemplary embodiments according to a concept of the present invention may be variously modified with various formats, and therefore the exemplary embodiments will be exemplarily illustrated in the accompanying drawings and will be described in detail in the present specification. However, it is to be understood that the invention is not limited to the disclosed embodiments, but is intended to cover various modifications, equivalent arrangements, or alternatives included within the spirit and scope of the present invention.

Throughout the specification, the term "first" or "second" may be used for describing various constituent elements, but the constituent elements shall not be limited by the above terms. The terms may be used only for the purpose of discriminating one constituent element from another constituent element, for example, a first constituent element may be called a second constituent element, and a second constituent element may be called a first constituent element, without departing from the scope of the concept of the present invention.

It should be understood that, when it is described that an element is "coupled" or "connected" to another element, the element may be "directly coupled" or "directly connected" to the another element or "coupled" or "connected" to the another element through a third element. In contrast, it should be understood that, when it is described that an element is "directly coupled" or "directly connected" to another element, no element is present between the element and the other element. Other expressions that describe a relationship between constituent elements, such as "between" and "directly between" or "adjacent to" and "directly adjacent to" should also be similarly understood.

Terms used in the present specification are used only to describe specific exemplary embodiments, and are not intended to limit the present invention. Singular expressions used herein include plural expressions unless they have definitely opposite meanings in the context. In the present specification, it should be understood that the term "include" indicates that a feature, a number, a step, an operation, a component, a part, or a combination thereof described in the specification is present, but does not exclude a possibility of presence or addition of one or more other features, numbers, steps, operations, components, parts, or combinations, in advance.

Unless indicated otherwise, it is to be understood that all terms used in the specification including technical and scientific terms have the same meaning as those that are understood by those who are skilled in the art. Terms defined in a generally used dictionary shall be construed such that they have meanings matching those in the context of a related art, and shall not be construed in idealized or excessively formal meanings unless they are clearly defined in the present specification.

Hereinafter, an apparatus for transmitting personal information in individually unidentifiable way according to an exemplary embodiment of the present invention will be described with reference to the accompanying drawings.

FIG. 1 is a schematic view for illustrating the utilization of a transmission apparatus according to an exemplary embodiment of the present invention.

In general, personal information is stored in a terminal of each individual or a terminal in a management area so as to utilize information including the personal information. The personal information stored in the terminal is transmitted to a server which can be accessed by a plurality of terminals, and the server stores a massive amount of personal information and analyzes the personal information so as to generate public result data. However, the above-stated method utilizes identifiable personal information, and thus still has a risk of personal information leakage even through personal information is stored in an access-limited server. Personal information stored in a terminal can be encrypted, but when a system of encryption is understood, the encrypted information can be decrypted and thus the encrypted personal information can be used for identifying the corresponding person. In addition, although the personal information stored in the terminal is de-identified by de-identification process, the de-identification process can be performed outside of the corresponding terminal, where identifiable personal information needs to be transmitted to the outside and identifiable personal information can be recorded before the de-identification process by an external apparatus.

For this reason, through a system shown in FIG. 1, a massive amount of personal information is not stored as is, but is processed into unidentifiable personal information, not into identifiable personal information, and then transmitted to a server such that the server can implement an intended data analysis without storing or leaking the personal information.

Referring to FIG. 1, a first terminal and a second terminal can exchange data through wired/wireless communication, and the first terminal or the second terminal can be also connected with and exchange data with a third terminal, a fourth terminal, . . . , or a k-th terminal, by utilizing the transmission apparatus according to the exemplary embodiment of the present invention. For example, assume that the second terminal and the fourth terminal include information on a specific event of influenza (flu) infection, where flu infection information is defined as information on whether a user of each terminal is currently infected by a flu virus. The server shown in FIG. 1 is an apparatus that acquires and predicts flu infection information, a flu spread route, the number of infectees, and the like. When flu infection information and location information of a terminal stored in the corresponding terminal are directly transmitted from the terminal to the server, the information of a specific terminal for which the user is infected by a flu virus is leaked to the server, and accordingly, the location information of the user is also leaked to the server. However, the flu infection information or the location information are extremely personal information, and thus transmission or receiving of these information is restrictively prohibited, and when the information is disclosed, the information can be abused in various crimes.

The transmission apparatus according to the exemplary embodiment of the present invention implies each terminal shown in FIG. 1. The second terminal and the fourth terminal include information on a specific event of flu infection. The first to fourth terminals respectively generate unidentifiable identifiers (IDs) rather than identifiable unique identifiers. The unidentifiable ID can be a random combination of letters, symbols, or numbers. As shown in FIG. 1, the second terminal is located within a communication range within which the first terminal can acquire information from the second terminal without providing its unique information. And the first terminal is located within the communication range within which the second terminal can acquire information from the first terminal without providing its unique information. The first terminal acquires the unidentifiable ID of the second terminal disclosed by the second terminal. Similarly, the third terminal acquires the unidentifiable ID of the fourth terminal. Since the third terminal that does not include flu infection information, it does not disclose its unidentifiable ID but discloses the unidentifiable ID of the fourth terminal, acquired from the fourth terminal, such that the first terminal acquires the unidentifiable ID of the fourth terminal.

The first terminal stores the unidentifiable ID information of an unknown terminal which has stored a flu infection information for the first time. The first terminal stores an estimated receiving time when the unidentifiable ID was most recently acquired from the unknown terminal at one terminal among terminals through which the unidentifiable ID information has been passed until being acquired by the first terminal. The first terminal stores an estimated location information of the unidentifiable ID terminal at the aforementioned most recent receiving time, where the unidentifiable ID terminal is defined as the terminal disclosing the unidentifiable ID for the first time. That is, the first terminal stores an unidentifiable ID information of the fourth terminal which stored a flu infection information, estimated receiving time at which the third terminal acquired the information, and estimated location of the fourth terminal at the receiving time. The receiving time and the location of the unidentifiable ID terminal at the receiving time can be estimated as a time at which the first terminal acquired the corresponding unidentifiable ID, location information of the first terminal at the receiving time, and a time at which the location information is determined. In addition, the first terminal stores the unidentifiable ID information of the second terminal which stored a flu infection information, estimated receiving time at which the first terminal acquired the unidentifiable ID information, and estimated location of the second terminal at the estimated receiving time. However, the unidentifiable IDs do not enable identifying terminals which initially generated the flu infection information stored in the first terminal. The unidentifiable IDs only indicate that infectees use two of terminals from which the first terminal can acquire information through disclosing and receiving process. The first terminal may assume that a user of the second terminal is an infectee since the first terminal acquired an unidentifiable ID from the second terminal. However, since the second terminal may also acquire the unidentifiable ID from another terminal that is located close to the second terminal, the first terminal cannot convince that the user of the second terminal is an infectee, as opposed to the aforementioned assumption. When the first terminal transmits such information to the server, the server can only recognize the existence of two infectees in the area shown in FIG. 1 and obtain information on locations of these two infectees whereas the server cannot determine which terminal is an infectee terminal.

The apparatus for transmitting personal information in individually unidentifiable way according to the exemplary embodiment of the present invention is an apparatus needed to construct a system which actualizes concepts illustrated with FIG. 1, and will be described in detail hereinafter.

For convenience of description, personal information stored in the terminal is assumed to be disease infection information.

Figure 2:
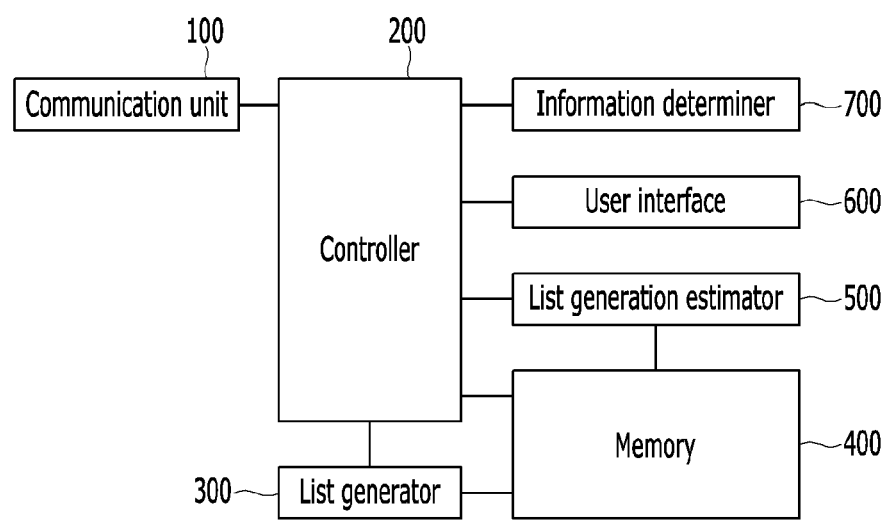
FIG. 2 is a block diagram of the transmission apparatus according to the exemplary embodiment of the present invention.

FIG. 2 is a block diagram of the transmission apparatus according to the exemplary embodiment of the present invention.

As shown in FIG. 2, a transmission apparatus 10 according to the exemplary embodiment of the present invention includes a communication unit 100, a controller 200, a list generator 300, and a memory 400. A communication unit 100 is connected with an external terminal for performing communication. A controller 200 generates an unidentifiable ID for de-identification of the apparatus 10 and sets up a transmission cycle, an acquisition interval, or a disclosure interval. A list generator 300 acquires an ID list disclosed by the external terminal through the communication unit 100 and generates an ID list for storage, an ID list acquired in acquisition interval, an ID list for disclosure, and an ID list for transmission. A memory 400 stores the ID list for storage, the ID list acquired in acquisition interval, the ID list for disclosure, and the ID list for transmission which the list generator 300 generates.

In addition, the transmission apparatus 10 according to the exemplary embodiment of the present invention further includes a list generation estimator 500 to estimate a generation time and a generation location of the ID list acquired in acquisition interval, a user interface 600, and an information determiner 700 determining whether first information of a user, input through the user interface 600, match second information transmitted from a server.

The communication unit 100 includes a module for Wi-Fi Direct, Wi-Fi, or Beacon communication, and the transmission apparatus 10 can transmit and acquire data with other terminals located at the peripheral area thereof. Communication protocols between the transmission apparatus 10 and other terminals can be the same, and formats of unique ID numbers of the respective terminals can be the same.

The communication unit 100 can transmit or acquire various kinds of information. For example, the communication unit 100 can acquire information related to a specific disease according to a user's request. The communication unit 100 can acquire information related to a common disease without a user's request. The information related to a common disease includes a general method to cope with diseases or lifestyle for prevention of diseases. The information related to specific diseases can be information such as a specific disease infection map derived by using infection information, which is personal information input from terminal users, and can be displayed in terminals.

The controller 200 generates the identifier for de-identification of the apparatus 10 and sets the transmission cycle, the acquisition interval, or the disclosure interval.

Figure 3:
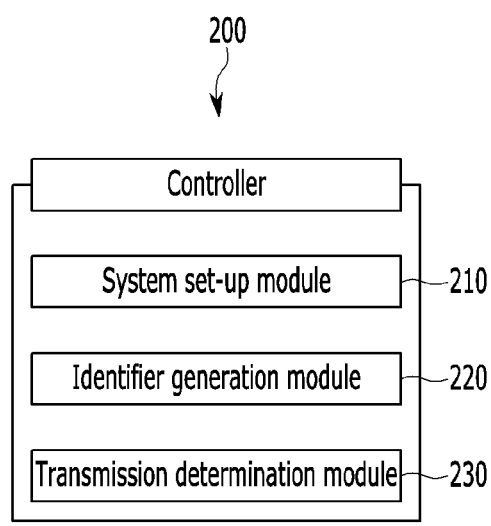
FIG. 3 is a detailed block diagram of a controller of the transmission apparatus according to the exemplary embodiment of the present invention.

FIG. 3 is a detailed block diagram of the controller according to the exemplary embodiment of the present invention.

As shown in FIG. 3, the controller 200 includes a system set-up module 210, an ID generation module 220, and a transmission determination module 230.

The system set-up module 210 determines the transmission cycle of the apparatus 10, determines the acquisition interval during which the ID list disclosed by external terminal is acquired by the apparatus 10, and determines the disclosure interval during which the ID list for disclosure is disclosed by the apparatus 10.

The transmission apparatus according to the exemplary embodiment of the present invention performs an iterative process per each transmission cycle set by the system set-up module 210. For example, the period of transmission cycle can be set to be every hour, every 30 minutes, every 10 minutes, or every minute, and transmission time of information stored in the apparatus is determined with reference to the period of transmission cycle.

The transmission cycle, the acquisition interval, and the disclosure interval will be described with reference to FIG. 4.

Figure 4:
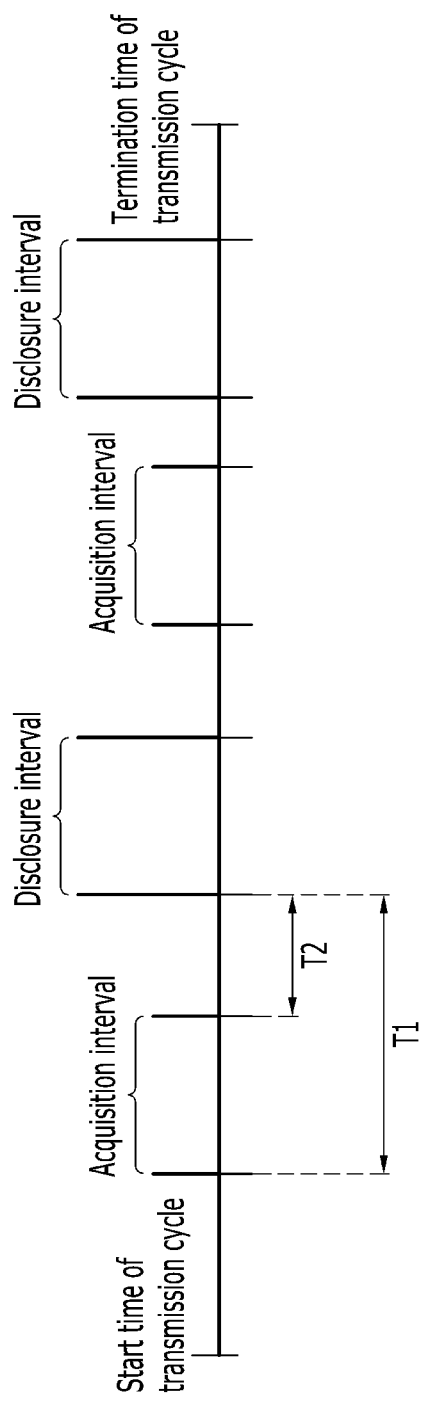
FIG. 4 is a diagram provided for description of acquisition intervals and disclosure intervals in a transmission cycle.

FIG. 4 is a diagram provided for description of acquisition intervals and disclosure intervals in a transmission cycle.

The transmission cycle means a cycle for transmitting the ID list for transmission to the server.

Start time and termination time of the transmission cycle of each terminal are the same. An ID of each terminal is generated at the start time of the transmission cycle and is maintained until the termination time of the transmission cycle. Thus when the period of transmission cycle is set long enough, a moving route of a terminal can be tracked with a single terminal ID during the transmission cycle. This can be used in tracking an infection route of a disease.

The acquisition interval is a time interval during which the ID list disclosed by an external terminal is acquired. Start time and termination time of the acquisition interval are arbitrarily determined by each terminal. The start time of the acquisition interval can set to be a predetermined time $T_1$ before the start time of the disclosure interval of the transmission cycle. Or start time of the acquisition interval can be periodically or arbitrarily determined without regard to the start time of the disclosure interval. The transmission apparatus 10 acquires the ID list disclosed by another terminal during a predetermined time interval ($T_1$-$T_2$) as shown in FIG. 4. In this case, start time of the first acquisition interval for acquiring the ID list disclosed can be arbitrarily determined. Also, the start time of the first acquisition interval can be determined through random number generation and the like. The number of acquisition intervals can be set to one or more than one. When the number of acquisition intervals is set to be more than one, the start time of the first acquisition interval is arbitrarily determined and the start time of the next acquisition interval can be set at a predetermined interval after the first acquisition interval while it does not exceed the termination time of the transmission cycle. Similar to the process of determining more than one start times of the disclosure interval within the transmission cycle, more than one start times of the acquisition interval may be determined within the transmission cycle.

The ID list for disclosure is generated by using the ID list for storage which is stored in the transmission apparatus 10. The disclosure interval is a time interval during which The ID list for disclosure is disclosed to another terminal such that the other terminal can acquire the ID list for disclosure. Start time and termination time of the disclosure interval can be arbitrarily determined by each terminal.

One or more than one start times of the disclosure interval may be set within the transmission cycle. A process for determining a single start time of the disclosure interval within the transmission cycle is as follows. The transmission apparatus 10 generates a random number between 0 and 100.

When the generated random number is r, the start time of the disclosure interval can be determined as the equation: (start time of the disclosure interval)=start time of transmission cycle+((period of transmission cycle)−(length of disclosure interval))*r/100. For example, when the period of transmission cycle is 30 minutes, a start time of the transmission cycle is 2 p.m., the minimum length of the disclosure interval is 10 minutes, and r=75, a start time of the disclosure interval within the corresponding cycle period is at 855 minutes after 12 a.m.

During the transmission cycle, a disclosure interval can be set to end at the minimum length of the disclosure interval after the start time of the disclosure interval or end when the ID list for disclosure is transmitted to the server. When a disclosure interval is set to end at the minimum length of the disclosure interval after the start time of the disclosure interval in order to fulfill the minimum disclose duration requirement and the transmission time arrives before the termination of the disclosure interval, the minimum disclose duration requirement may be considered fulfilled.

A process for determining more than one start times of the disclosure interval within the transmission cycle is as follows.

One or more than one start times of the disclosure interval can be determined by repeating the following process between the first start time of the disclosure interval and the termination time of the transmission cycle. First, the transmission apparatus 10 generates a random number between 0 and 100. When the generated random number is r, the first start time of the disclosure interval within the transmission cycle can be determined as the equation: (start time of the disclosure interval)=start time of transmission cycle+((period of transmission cycle)−(length of disclosure interval))*r/100. A termination time (S) of a (j−1)-th disclosure interval can be determined as the equation: (termination time of the (j−1)-th disclosure interval (denoted by S))=(start time of the (j−1)-th disclosure interval)+(length of the disclosure interval). Start time of a j-th disclosure interval can be determined as the equation: (start time of the j-th disclosure interval)=(termination time of the (j−1)-th disclosure interval (denoted by S))+(residual time of the corresponding transmission cycle at S)*r/100. If the start time of the j-th disclosure interval is before a time obtained by subtracting the length of the disclosure interval from the termination time of the transmission cycle, a start time of a (j+1)-th disclosure interval is determined by repeating the above-described calculation process. Otherwise, a start time of the disclosure interval is no longer produced.

An update period within the transmission cycle means a period during which the ID list acquired in acquisition interval is updated within the acquisition interval, and the update period can or cannot be the same in all terminals.

The identifier generation module 220 generates the unidentifiable ID for de-identification of the apparatus. An unidentifiable ID is generated not only in the transmitting apparatus according to the embodiment of the present invention but also in each of all other terminals in the vicinity. The identifier generation module 220 can generate an unidentifiable ID by randomly combining text, numbers, or symbols.

Figure 5:
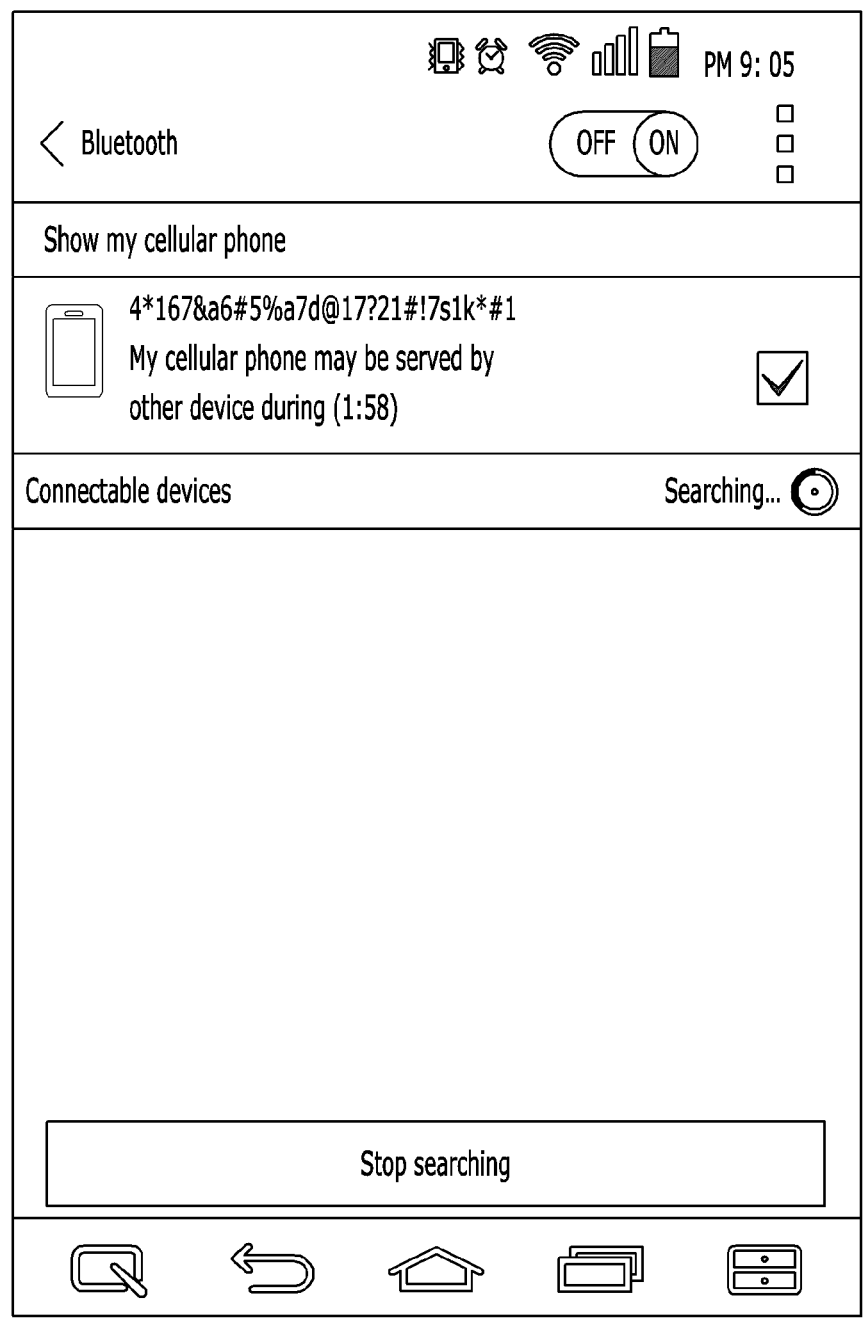
FIG. 5 illustrates an ID list for disclosure in an actual apparatus.

FIG. 5 illustrates an ID list for disclosure in an actual apparatus.

As shown in FIG. 5, an ID of a Wi-Fi direct terminal, consisting of 10 identifiers of 4*1, 67&, a6#, 5% a, 7d@, 17?, s21, #!7, s1k, and *#1, is disclosed. That is, the ID list for disclosure, which will be described hereinafter, is disclosed in the data format shown in FIG. 5 from the above-described start time of the disclosure interval, and external terminals in the vicinity of the apparatus 10 can read this information.

The transmission determination module 230 determines whether or not to transmit the ID list for transmission at the termination time of the transmission cycle. When a terminal provides its unique information and transmits an ID list for transmission to a server, the terminal which has transmitted the ID list for transmission can be inevitably specified.

The following instance exemplifies that a person can be specified within the transmission cycle including a plurality of acquisition intervals. When a specific ID is iteratively listed on the ID list acquired in a plurality of the acquisition intervals within one transmission cycle, a person of the specific ID can be specified.

TABLE 1

| acquisition interval No. | | 1 | |
|---|---|---|---|
| Terminal that can be scanned | A | B | C |
| Generated terminal ID | #11 | #22 | #33 |
| Infection status | ○ | X | X |

TABLE 2

| acquisition interval No. | | 2 | |
|---|---|---|---|
| Terminal that can be scanned | A | E | D |
| Generated terminal ID | #11 | &44 | &55 |
| Infection status | ○ | X | X |

Table 1 and Table 2 show information on the first acquisition interval and information on the second acquisition interval. Only the user of terminal A is an infectee and the users of the other terminals are non-infectees. Terminals A, B, and C can transmit ID lists for transmission to the server at termination time of the first acquisition interval which are shown in Table 3.

TABLE 3

| ID list of terminal A | ID list of terminal B | C |
|---|---|---|
| #11 | #11 | #11 |

At termination time of the second acquisition interval, terminals A, D, and E can transmit ID lists for transmission to the server which are shown in Table 4.

TABLE 4

| ID list of terminal A | ID list of terminal D | ID list of terminal E |
|---|---|---|
| #11 | #11 | #11 |

When the terminals access the server, the server recognizes the unique identification numbers of the respective terminals. Thus, one infectee exists in each of the first and second acquisition intervals and only terminal A exists in both of the first and second acquisition intervals, and only one ID, i.e., #11, is listed as an infectee on the ID lists for transmission transmitted during these two acquisition intervals. Such information indicates that one infectee terminal exists in two intervals and participates in both of the two periods, thus implying that terminal A is the infectee terminal.

Certainly, it cannot be 100% sure that terminal A is the infectee terminal, since a fourth terminal in addition to three terminals can exist in each of the first and second acquisition intervals and the fourth terminal can participate in disclosure and sharing of infectee information without transmitting an ID list thereof.

Thus, in order to solve this problem of being personally identified that may occur when a plurality of acquisition intervals exist in one transmission cycle, transmission determination module 230 according to the exemplary embodiment of the present invention determines to not transmit the ID list for transmission at the infectee terminal at the termination time of the transmission cycle. Accordingly, the server cannot determine existence of the infectee terminal. Also, only some of non-infectee terminals are set to transmit their ID list for transmission to the server. For example, a transmission probability P for each of non-infectee terminals can be determined by generating a random number. Assume that P=70%, and a random number r is generated between 0 and 1 and thus r=0.8 is obtained. In this case, since r>P, the corresponding terminal does not transmit the infectee ID list for transmission to the server. Similarly, other non-infectee terminals determine whether or not to transmit their infectee ID lists to the server. Some of all terminals, excluding the infectee terminal, transmit their ID lists, so that infectee terminals are prevented from being identified. The value P can be set to be automatically determined by the number of scanned terminals. It is desirable that the value P decreases as the number of scanned terminals increases and P increase as the number of scanned terminals decrease such that a sufficient number of terminals can transmit infection information about the corresponding region to the server.

Figure 6:
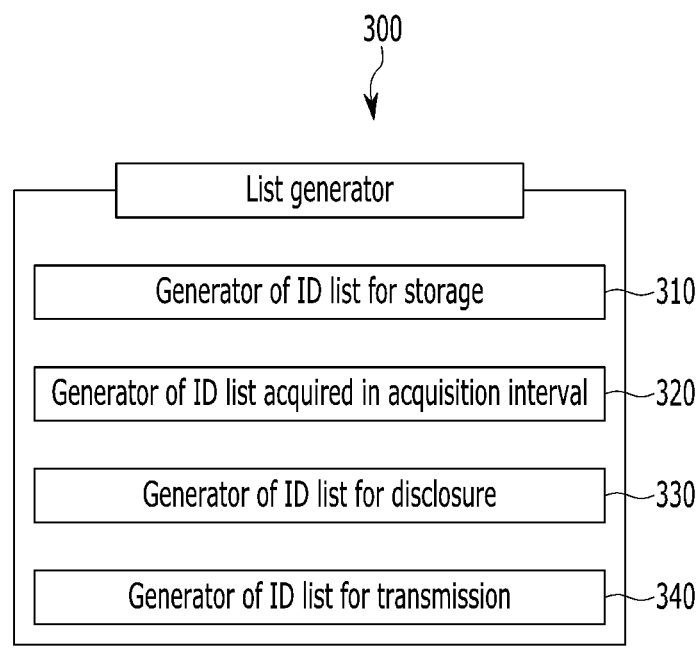
FIG. 6 is a block diagram of a list generator according to the exemplary embodiment of the present invention.

FIG. 6 is a block diagram of the list generator according to the exemplary embodiment of the present invention.

As shown in FIG. 6, the list generator 300 includes a generator 310 to generate the ID list for storage, a generator 320 to generate the ID list acquired in acquisition interval, a generator 330 to generate the ID list for disclosure, and a generator 340 to generate the ID list for transmission.

The generator 310 to generate the ID list for storage acquires ID lists disclosed by other terminals through the communication unit 100 and generates the ID list for storage. For a transmission apparatus, the ID list for storage can be constituted by infectee IDs on the ID lists disclosed by other terminals within network scan-range. When the apparatus user is infected, the apparatus' ID is also included in the ID list for storage. The ID list for storage is blanked out at the start time of transmission cycle.

The generator 320 to generate an ID list acquired in acquisition interval generates an ID list acquired in acquisition interval by storing or updating infectee ID lists acquired from other terminals during the acquisition interval. The ID list acquired in acquisition interval is stored in a memory together with the generation time and generation location of the acquired ID list, estimated by a list generation estimator, which will be described later.

The generator 330 to generate an ID list for disclosure rearranges the order of IDs extracted from an ID list for storage and generates an ID list for disclosure which is disclosed to external terminals during a disclosure interval. More specifically, the ID list for storage is constituted by the ID lists acquired in acquisition interval, and the generator 330 generates an ID list for disclosure by extracting IDs from some or all of the ID lists acquired in acquisition interval. The ID list for disclosure is constituted by processing some or all IDs on the ID list for storage and then is disclosed, and the length of the ID list for disclosure can be arbitrarily set.

The generator 330 generates an ID list for disclosure as follows. The latest ID list for storage generated before the start time of a disclosure interval is partially or wholly extracted by the generator 330 while the length of the extracted ID list does not exceed the predetermined length of the ID list for disclosure. Then, the order of IDs on the extracted ID list is rearranged by the generator 330. The rearranged ID list is an ID list for disclosure. When a user of the transmission apparatus is infected, an ID of the transmission apparatus is also included in the ID list for disclosure and then the ID list for disclosure is disclosed. A disclosure method can be determined using various communication modules. As shown in FIG. 5, for example, the infectee terminal IDs on the ID list for disclosure can be lined up and disclosed as a device name of Wi-Fi Direct device.

The generator 340 to generate the ID list for transmission generates the ID list for transmission to be transmitted to the server at termination time of the transmission cycle. The ID list for transmission is generated by partially or wholly extracting the IDs on the ID list for storage. A method for determining whether or not to transmit the ID list for transmission and a type of additional information to be transmitted together with the ID list for transmission can be determined in various ways. In particular, whether or not to transmit the ID list for transmission or the type of additional information to be transmitted together with the ID list for transmission can be determined according to the accuracy of estimated values of generation time and generation location of the ID list acquired in acquisition interval, when the estimated values are transmitted together to the server with the ID list for transmission. A method to estimate the generation time and the generation location will be described in the following section which describes the list generation estimator that estimates the generation time and generation location of an ID list acquired in acquisition interval.

The list generation estimator 500 estimates the generation time and generation location of a ID list acquired in acquisition interval. Assume that the list generation estimator 500 estimates generation time and generation location of the k-th ID list acquired in acquisition interval, where various estimation methods can be used. Since the infectee IDs of the k-th ID list acquired in acquisition interval are mostly acquired from other terminals, the generation time and generation location of the IDs are mostly not known. Hence, the generation time and generation location of these IDs can be estimated only with reference to when the IDs were acquired by the terminal generating the k-th ID list acquired in acquisition interval For example, the generation time and generation location of the k-th ID list acquired in acquisition interval can be estimated as follows. Among all time points to obtain a piece of location information of the terminal (which is transmission apparatus according to the exemplary embodiment of the present invention) used to acquire IDs, a time point is selected such that the time point is closest to the last update time of the k-th ID list. The selected time point and the location information obtained at the selected time point can be respectively used as the estimates of the generation location and generation time of the ID list acquired in the acquisition interval under estimation. In addition, a centroid of latitudes and longitudes of all location information determined within the acquisition interval of the terminals used to acquire IDs and a center point of those generation times can be used to estimate a generation location and generation time of the corresponding ID list acquired in acquisition interval. A generation location and generation time of the k-th ID list acquired in acquisition interval are estimated using one of the above-stated methods, which are stored as the generation information of the acquired ID list in the memory. Alternatively, the latitudes and longitudes of location information and their generation times determined within the acquisition interval of the terminal used to acquire IDs can be formed into a data set, which can be stored as "generator of the ID list acquired" in the memory.

The user interface 600 is an apparatus that is provided in the transmission apparatus according to the exemplary embodiment of the present invention, and enables a user to input data there through. The user interface 600 includes all usable interfaces through which the user can input information on whether or not the user is infected by a disease.

The information determiner 700 determines whether a first information of the user, input through the user interface 600 and stored in the memory 400, matches a second information transmitted from a server of a credible organization or group. For example, when the user of the transmission apparatus 10 is not infected by a disease but the user is input as an infected user to the transmission apparatus 10, the information determiner 700 can compare the input information with information acquired from a database of a health insurance review & assessment service or a database of a disease control and prevention center to determine whether the input information is false information and can no longer permit the user to use services of the transmission apparatus 10.

As another example, assume that it is December and a user inputted his infection information into his transmission apparatus last October. His honesty level can be calculated by the information determiner 700 in such a way that his inputted information is compared with his true infection status in last October which was obtained from the database of the health insurance review & assessment service or the database of the disease control and prevention center in November. Only when his honesty level in last October is higher than a predetermined level, the information determiner 700 permits him to use services in December.

Hereinabove, each constituent element of the transmission apparatus according to the exemplary embodiment of the present invention has been described. A process for generating a list and transmitting the list through operation of the transmission apparatus will now be described with reference to FIG. 7.

Figure 7:
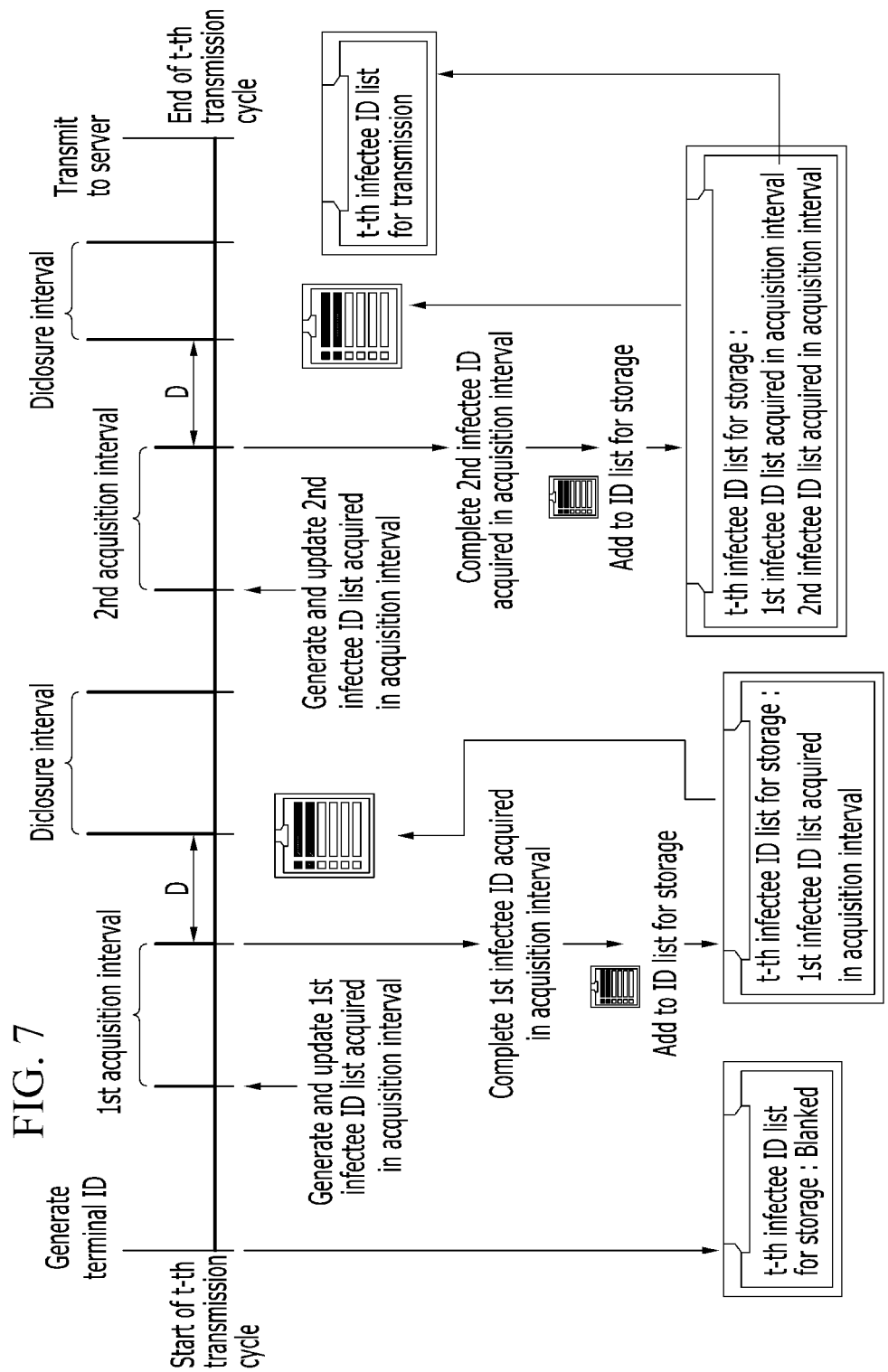
FIG. 7 is an operation flowchart of the transmission apparatus according to the exemplary embodiment of the present invention.

FIG. 7 is an operation flowchart of the transmission apparatus according to the exemplary embodiment of the present invention.

As shown in FIG. 7, a case where a start time of the acquisition interval of the transmission apparatus 10 is ahead of a start time of the corresponding disclosure interval by a predetermined time (D) will be described. Acquisition intervals can overlap each other depending on the setting, but in this case, an additional ID list acquired in acquisition interval can be generated and then updated. For convenience of description, assume that a specific event is disease infection. Accordingly, an ID list for storage becomes an infectee ID list for storage, an ID list for disclosure becomes an infectee ID list for disclosure, and an ID list for transmission becomes an infectee ID list for transmission.

The transmission apparatus 10 according to the exemplary embodiment of the present invention and all terminals have the same start time and termination time of transmission cycle. If the start times of transmission cycles are different from one another, a transmission cycle period of one terminal can continuously overlap with two consecutive transmission cycle periods of another terminal, and accordingly, two different IDs are generated for the latter terminal during a transmission cycle of the former and thus the latter is recognized as different terminals to the former.

As described above, an iterative process is performed during each transmission cycle, and the transmission cycle period can be variously set at one hour, 30 minutes, or 10 minutes.

At a start time of the transmission cycle, an ID of the transmission apparatus is generated. At the start time of the transmission cycle, the infectee ID list for storage is blanked out and thus no data is included. The controller 200 sets the disclosure interval and the acquisition interval with reference to predetermined input information.

The generator 310 generates an infectee ID list for storage by appending an infectee ID list acquired in acquisition interval which is generated for each acquisition interval. At the start time of the first acquisition interval, the generator 320 generates a blanked infectee ID list of the first acquisition interval. Then, at the start time of the first acquisition interval, the generator 320 acquires infectee IDs on the infectee ID lists disclosed by other terminals located within a range that can be scanned, and then appends the acquired infectee IDs to the infectee ID list for the first acquisition interval. For every predetermined update cycle, the generator 320 repeatedly acquires infectee IDs on the infectee ID list disclosed by other terminals located within the range that can be scanned and then adds the acquired infectee IDs to the infectee ID list for the first acquisition interval until the termination time of the first acquisition interval. In this case, only one ID among duplicated IDs is listed. The generator 320 updates the infected ID list for the first acquisition interval until the termination time of the first acquisition interval, where the last updated infectee ID list for the first acquisition interval is called the infectee ID list acquired in the first acquisition interval, which the generator 310 adds to the infectee ID list for storage. Similarly, an infectee ID list acquired in the kth acquisition interval is generated until termination time of the transmission cycle and is added to the infectee ID list for storage (k=2, 3, . . . ).

Where there exist many terminals from which infectee ID lists for disclosure can be acquired, a scanning range of terminals can be narrowed to reduce the possibility that more than one terminals within the scanning range have the same ID. For example, in an environment like a subway where many terminals exist within a scanning range, the scanning radius of terminals can be narrowed to reduce the possibility that more than one terminals within the scanning range have the same ID. Here, IDs of other terminals obviously imply unidentifiable IDs generated hereinabove rather than identifiable unique IDs of terminals.

An infectee ID list acquired in the k-th acquisition interval becomes the k-th appended infectee ID list to the infectee ID list for storage. However, if it is determined that a person can be specified through the infectee ID list acquired in the k-th acquisition interval, the ID list is not appended to the infectee ID list for storage.

One example of the situation in which a person can be specified is that no other terminal exists within a scanning range of the first terminal and a user of the first terminal is input as an infectee. Another example is that the number of the other terminals within a scanning range of a terminal is equal to the number of IDs excluding the ID of the scanning terminal that are on the infectee ID list acquired in the k-th acquisition interval. That is, assume that only two terminals exist in a vacant lot having an area of one in square kilometers and accordingly, each of them can search only the other within its scanning range, the users of the two terminals both are input as infectee because they are both infected, and only a first terminal among the two users is allowed to be disclosed. In this case, the IDs of the two terminals are on an infectee ID list of the first terminal acquired in acquisition interval, and only the second terminal's own ID is on an infectee ID list of the second terminal acquired in acquisition interval. Here, the number of other terminals in the scanning range of the first terminal is zero, the number of IDs listed on an infectee ID list of the first terminal acquired in acquisition interval, excluding the ID of the first terminal, is zero, the number of other terminals within the scanning range of the second terminal is 1, and the number of IDs on the infectee ID list of the second terminal acquired in acquisition interval, excluding the ID of the second terminal, is 1. For each of the first terminal and the second terminal, the number of other terminals in the scanning range is equal to the number of IDs on the infectee ID list acquired in acquisition interval, excluding the ID of the scanning terminal. Hence, the corresponding infectee ID list of each terminal acquired in acquisition interval is not appended to its infectee ID for storage.

The list generation estimator 500 estimates the generation time and generation location of the k-th infectee ID list acquired in the k-th acquisition interval.

An infectee ID list disclosed from another terminal acquired in the first acquisition interval is acquired and then appended to the infectee ID list for storage. After that, the infectee ID list for disclosure according to the exemplary embodiment of the present invention is disclosed during the disclosure interval. Preferably, the infector ID list for disclosure is configured by prioritizing the most recently generated IDs on the infector ID list acquired in acquisition interval that are stored in the infectee ID list for storage. It is advantageous to use the most recently acquired infector ID list to estimate a generation time and a generation location of the infector ID list acquired in acquisition interval.

If the estimated generation time and generation location of a specific infectee ID list acquired in acquisition interval which is included in the infectee ID list for storage are different over a certain level from a disclosure time and a disclosure location of a terminal to be used for disclosure, the specific infectee ID list acquired in acquisition interval can be set not to be used to generate an infectee ID list for disclosure.

Although the estimated generation time and generation location of a specific infectee ID list acquired in acquisition interval which is included in the infectee ID list for storage are not different over a certain level from a disclosure time and a disclosure location of a terminal and thus the acquired infectee ID list is eligible to be used to generate an infectee ID list for disclosure, it may happen that the infectee ID list acquired cannot be used to generation of the infectee ID list for disclosure due to limitation in length of the infectee ID list for disclosure. In this case, with respect to two consecutive disclosure intervals each of which start time is not different over a certain level from one another, when a location of a terminal at a preceding disclosure interval and a location of the terminal of the later disclosure interval are not different from each other over a certain level, the most recently generated infectee ID list acquired in acquisition interval is used with top priority, where IDs that were not on the infectee ID list for disclosure in the previous disclosure interval can be further prioritized to generate the infectee ID list for disclosure. Accordingly, the restriction of the acquired information range due to the length limitation of the infector ID list for disclosure can be mitigated.

In the second acquisition interval, the infectee ID list for storage is updated through the same process as in the first acquisition interval until generating a final infectee ID list.

An infectee ID list for transmission is generated by partially or wholly extracting infectee ID lists for storage that are generated before termination time of the transmission cycle. In this case, a method for determining whether or not to transmit the generated infectee ID list for transmission to a server and determining types of additional information to be transmitted together with the generated infectee ID list for transmission may vary. In particular, whether or not to transmit the infectee ID list for transmission and additional information with the infectee ID list for transmission can be determined depending on accuracy of estimated values of generation time and generation locations of infectee ID lists acquired in acquisition interval which are included in the infectee ID list for transmission.

Depending on the accuracy of estimated location information of the infectee ID list acquired in an acquisition interval, the transmission determination module 230 of the controller 200 can determine whether or not to generate an infectee ID list for transmission with acquired infectee ID lists and transmit it at the termination time of the transmission cycle before transmission to the server. For example, when a transmission cycle period is 30 minutes and only user location information of a transmission apparatus is determined only at the start time and termination time of the corresponding transmission cycle, and if a location at the start time and a location at the termination time are too different to estimate a generation location of the corresponding k-th infectee ID list acquired in the k-th acquisition interval, the infectee ID list for transmission of the corresponding transmission cycle can be determined to not be transmitted to the server. In addition, when the location of a terminal is frequently changed, the accuracy of estimated value of generation location of an infectee ID list acquired in acquisition interval can be determined with consideration for possibility that the terminal might be moving on a vehicle or subway, where a terminal moving on a vehicle or a subway can be classified using a gyroscope or an acceleration sensor. The above-stated process is iteratively performed during acquisition intervals set between the start time and termination time of a transmission cycle such that a final infectee ID list for storage of the corresponding transmission cycle is completed before the termination time of the transmission cycle.

The transmission determination module 230 not only determines whether to transmit an infectee ID list for transmission to the server but also selects between transmitting an infectee ID list for transmission to a server and disclosing the infectee ID list for transmission to another terminal. For example, an infectee ID list for transmission, information on its generation time and generation location can be partially transmitted by the transmission apparatus 10 according to the exemplary embodiment of the present invention. If all the generation location information is transmitted, the location of a person who transmits the information can be disclosed to the server.

For a detailed description, exemplary cases of classifying pieces of information included in an ID list for transmission to be transmitted (i.e., the infectee ID list for transmission) and then determining whether to transmit these pieces of information to the server or transmit to the server through another terminal after being disclosed to the other terminal will be described.

First, an infectee ID list for transmission to be transmitted to the server can include only an infectee ID list acquired in acquisition interval. In this case, the location and movement of an infectee cannot be determined since only the infectee ID list is transmitted to the sever. Nevertheless, just figuring out the number of infectees in the entire area to be inspected is meaningful. Moreover, there is no risk of disclosing the location of a transmitting person.

Second, the transmission determination module 230 can transmit an infectee ID list acquired in acquisition interval together with estimated information only on its generation time when its generation time estimate is determined to be appropriate and its generation location estimate is determined to not be appropriate. In this case, information on the generation time is provided as an effective material for determining change in the infectee and the infectee ID list for transmission is determined to be transmitted to the server since no information on the generation location is included and the location of the transmitting person is not disclosed.

Third, the transmission determination module 230 can transmit an infectee ID list acquired in acquisition interval together with estimated information only on its generation location when its generation time estimate is determined to be not appropriate and its generation location estimate is determined to be appropriate. In this case, although accurate generation time cannot be determined, dispersion of infectees with respect to a specific period can be determined. However, there is a risk that a moving route of a transmission apparatus can be directly disclosed to the server when the transmission apparatus directly transmits information on the generation location to the server. In this case, the transmission determination module 230 discloses the infectee ID list for transmission including infectee ID lists acquired in acquisition interval and their generation location information such that another terminal can acquire the infectee ID list for transmission. The other terminal which has acquired the infectee ID list for transmission transmits the infectee ID list for transmission to the server. In this case, the other terminal can be an infectee terminal or not.

According to the above-stated process, although other terminal acquires generation location information included in the infectee ID list for transmission, the terminal cannot figure out whose information it is. Thus, the personal information of the transmission apparatus can be protected even though the information is transmitted to the server through the other terminal.

The other terminal can check infectee IDs acquired in acquisition interval that are included in the infectee ID list for transmission (i.e., ID list for transmission) so as to filter the redundancy of IDs before transmission to a server and then can transmit the infectee ID list for transmission to the server.

Fourth, the transmission determination module 230 can transmit an infectee ID list acquired in acquisition interval together with estimated information on its generation time and generation location when its generation time estimate is determined to be appropriate and its generation location estimate is determined to be appropriate. In this case, it is possible to figure out hourly change in the number of infectees and their locations. Like the above-stated third example, a moving route of a user of the corresponding transmission terminal can be disclosed to the server if the estimated generation location information is directly transmitted to the server. Due to such a risk, the transmission determination module 230 discloses an infectee ID list for transmission including infectee ID lists acquired in acquisition interval and their generation time and generation location information such that other terminals can acquire the infectee ID list for transmission and transmit the acquired infectee ID list for transmission to the server. Like the third case, the other terminal can be an infectee terminal or not.

The transmission apparatus 10 according to the exemplary embodiment of the present invention has been described hereinabove with an example of the disease infection, where a user of a terminal can select one of two answers (i.e., infectee and non-infectee) to the question about infection and an terminal ID of only an infectee is disclosed and acquired. However, the transmission apparatus 10 according to the exemplary embodiment of the present invention is applicable to multiple choice questions such as a poll of support of an election. The transmission apparatus 10 according to the exemplary embodiment of the present invention can be applied to multiple choice questions in various ways. For example, if an ID is generated and displayed in such a way that the ID follows a number associated with a choice that the user of the ID selected (e.g., when a ID list for disclosure is displayed as 1A@#E&F2ER#K@!, an ID of a terminal of a user who selected candidate number 1 is A@# and E&F and an ID of a terminal of a user who selected candidate number 2 is ER# and K@!), multiple choice questions can be applied to the transmission apparatus for transmitting personal information in individually unidentifiable way.

Hereinabove, the apparatus for transmitting personal information in individually unidentifiable way according to the exemplary embodiment of the present invention has been described. Hereinafter, a method for transmitting personal information in individually unidentifiable way according to another exemplary embodiment of the present invention will be described with reference to FIG. 8. A configuration that is duplicated in the previous exemplary embodiment of the present invention will be omitted.

Figure 8:
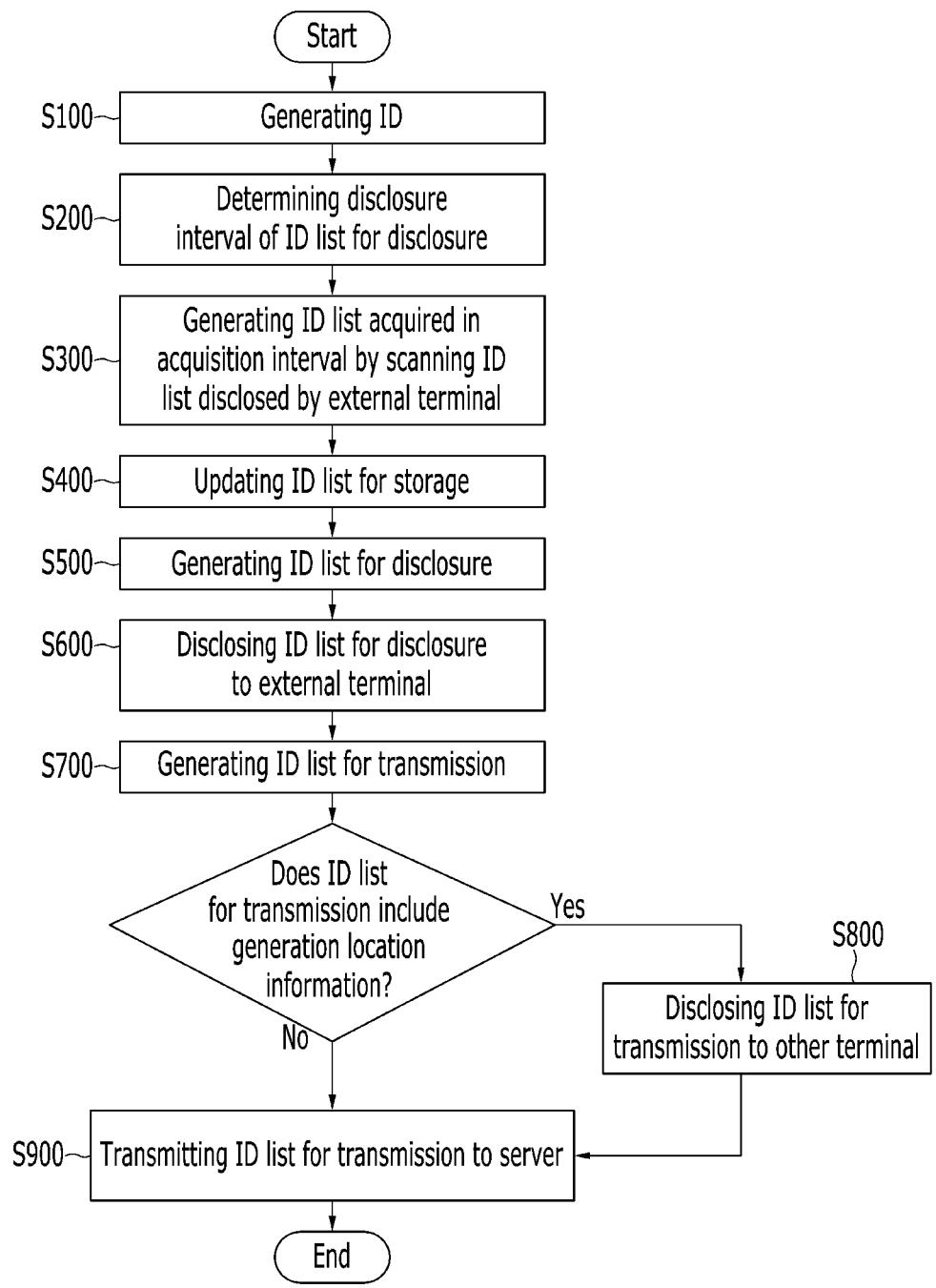
FIG. 8 is a flowchart of a method for transmitting personal information in individually unidentifiable way according to an exemplary embodiment of the present invention.

FIG. 8 is a flowchart of a method for transmitting personal information in individually unidentifiable way according to an exemplary embodiment of the present invention.

As shown in FIG. 8, a method for transmitting personal information in individually unidentifiable way includes: generating an ID of an apparatus (S100); determining a disclosure interval of a ID list for disclosure (S200); generating an ID list acquired in acquisition interval by scanning an ID list that are disclosed by an external terminal (S300); updating an ID list for storage by using the ID list acquired in acquisition interval (S400); generating an ID list for disclosure by rearranging or extracting the order of IDs included in the ID list for storage (S500); disclosing an ID list for disclosure to an external terminal (S600); generating an ID list for transmission that is to be transmitted to a server at termination time of a transmission cycle (S700); and transmitting an ID list for transmission to a server at the termination time of the transmission cycle of the apparatus (S900).

In S100, a combinable ID is generated by using the unique number of the apparatus, where ID is only for being distinguished from other terminal in the vicinity of the apparatus 10 and is not an identifiable unique number.

In S200, a disclosure interval is determined based on the transmission cycle period and a random number as in the previous exemplary embodiment, or a start time of disclosure interval is determined based on its disclosure duration, which is repeated until the termination time of the transmission cycle when multiple disclosures are performed.

In S300, an ID list for disclosure, generated from an external terminal that is adjacent to the apparatus, is acquired.

In S400, an ID list acquired in acquisition interval is acquired from an external terminal and then is used to update its corresponding ID list for storage. The ID list for storage is generated at a start time of transmission cycle. The ID list for storage stored in the memory is updated with an ID list for disclosure which is acquired from the external terminal.

During updating, a redundant ID is removed.

In S500, an ID list for disclosure is generated by permutating the order of IDs on the ID list for storage stored in the memory, re-combining the IDs, or partially extracting the IDs.

In S600, when an ID list for disclosure is generated, the ID list for disclosure is disclosed to the external terminal during a predetermined disclosure interval. An external terminal performs the same operation as the apparatus according to the present exemplary embodiment, but a redundant ID is removed. Since a start time or a termination time of a disclosure interval of an external terminal is set by the external terminal, the start time or the termination time of the external terminal is not likely to be the same as those of the apparatus according to the present exemplary embodiment.

In S700, an ID list for transmission, to be transmitted to the server, is generated at a time close to a termination time of the transmission cycle. An ID list for transmission is generated by partially or wholly extracting the ID list for storage generated before the termination time of the transmission cycle.

Next, it is determined whether generation location information is included in the ID list for transmission to be transmitted. If the ID list for transmission includes the generation location information, the ID list for transmission is not directly transmitted to the server. Instead, the ID list for transmission that includes the ID list acquired in acquisition interval and its generation location information and/or generation time information is disclosed to another terminal (S800). After that, the another terminal to acquire the disclosed ID list transmits the acquired information to the server (S900).

If the ID list for transmission does not include the generation location information, the ID list for transmission including the ID list acquired in acquisition interval and/or generation time information is directly transmitted to the server (S900).

Eventually, information transmitted to the server by using the method for transmitting personal information in individually unidentifiable way, implemented through the above-stated process, includes personal information, but cannot identify an individual, thereby preventing a disclosure of personal identifiable information, and unidentifiable ID is generated for sharing information between terminals without unique identification information or a start time of each disclosure interval is set to be different from one another, thereby preventing identification of personal information.

The invention claimed is:

1. A method for disclosing personal information in individually unidentifiable way by an apparatus, comprising:
   (a) generating an unidentifiable identifier (ID) of the apparatus with the personal information;
   (b) setting a transmission cycle,
      wherein the transmission cycle is a cycle for transmitting an ID list for transmission to a server,
      wherein the transmission cycle includes:
      at least one acquisition interval, which is a time interval during which at least one ID list disclosed by a first external terminal is acquired through a communication unit; and
      at least one disclosure interval, which is a time interval during which an ID list for disclosure is disclosed to a second external terminal through the communication unit,
      wherein a start time and a termination time of the acquisition interval and the disclosure interval respectively are set arbitrarily within the transmission cycle, or the start time of the acquisition interval is set to be ahead of the start time of the disclosure interval by a predetermined time, and
      wherein the transmission cycle of the apparatus is the same as that of the first external terminal;
   (c) acquiring at least one ID list disclosed by the first external terminal in the acquisition interval;
   (d) generating an ID list acquired in an acquisition interval by using an ID list disclosed by an unidentifiable communication unit of the first external terminal in the acquisition interval;
   (e) updating an ID list for storage by using the ID list acquired in the acquisition interval;
   (f) generating the ID list for disclosure by rearranging the order of IDs or extracting IDs included in the ID list for storage; and
   (g) disclosing the ID list for disclosure to the second external terminal during the disclosure interval.

2. The method of claim 1, further comprising, after (a) step, determining a disclosure interval of the ID list for disclosure.

3. The method of claim 1, wherein (e) step comprises determining whether a redundant ID is included in the ID list acquired from the external terminal and removing the redundant ID.

4. The method of claim 1, further comprising, after (g) step, generating an ID list for transmission to be transmitted to a server at a termination time of transmission cycle.

5. The method of claim 4, further comprising, after the generating the ID list for transmission, transmitting the ID list for transmission to the server at the termination time of the transmission cycle.

6. The method of claim 5, wherein the transmission of the ID list for transmission to the server comprises disclosing the ID list for transmission to another terminal when the ID list for transmission includes the ID list acquired in acquisition interval with generation location information, wherein the ID list for transmission is transmitted to the server by the another terminal.

7. The method of claim 1, further comprising:
   after the step (d), estimating generation time of the ID list acquired in the acquisition interval and generation location of the ID list acquired in the acquisition interval; and
   providing a user interface.

8. The method of claim 7, further comprising, after the step (d), determining whether a first information of a user, input through the user interface, and a second information transmitted from a server, match.

9. The method of claim 1, wherein the unidentifiable communication unit comprises a module for Wi-Fi Direct, Wi-Fi, Bluetooth, or Beacon communication.

10. The method of claim 1, further comprising, after the step (a),
determining the acquisition interval for acquiring the ID list disclosed by the first external terminal, and determining the disclosure interval for disclosing the ID list for disclosure.

11. The method of claim 10, wherein the step (a) is executed by random combination of text, numbers, or symbols.

12. The method of claim 10, wherein, when generation location information is included in the ID list for transmission, the transmission determination module controls the ID list for transmission including the ID list acquired in acquisition interval and the generation location information to be disclosed to other terminal.

* * * * *